Figure 1:
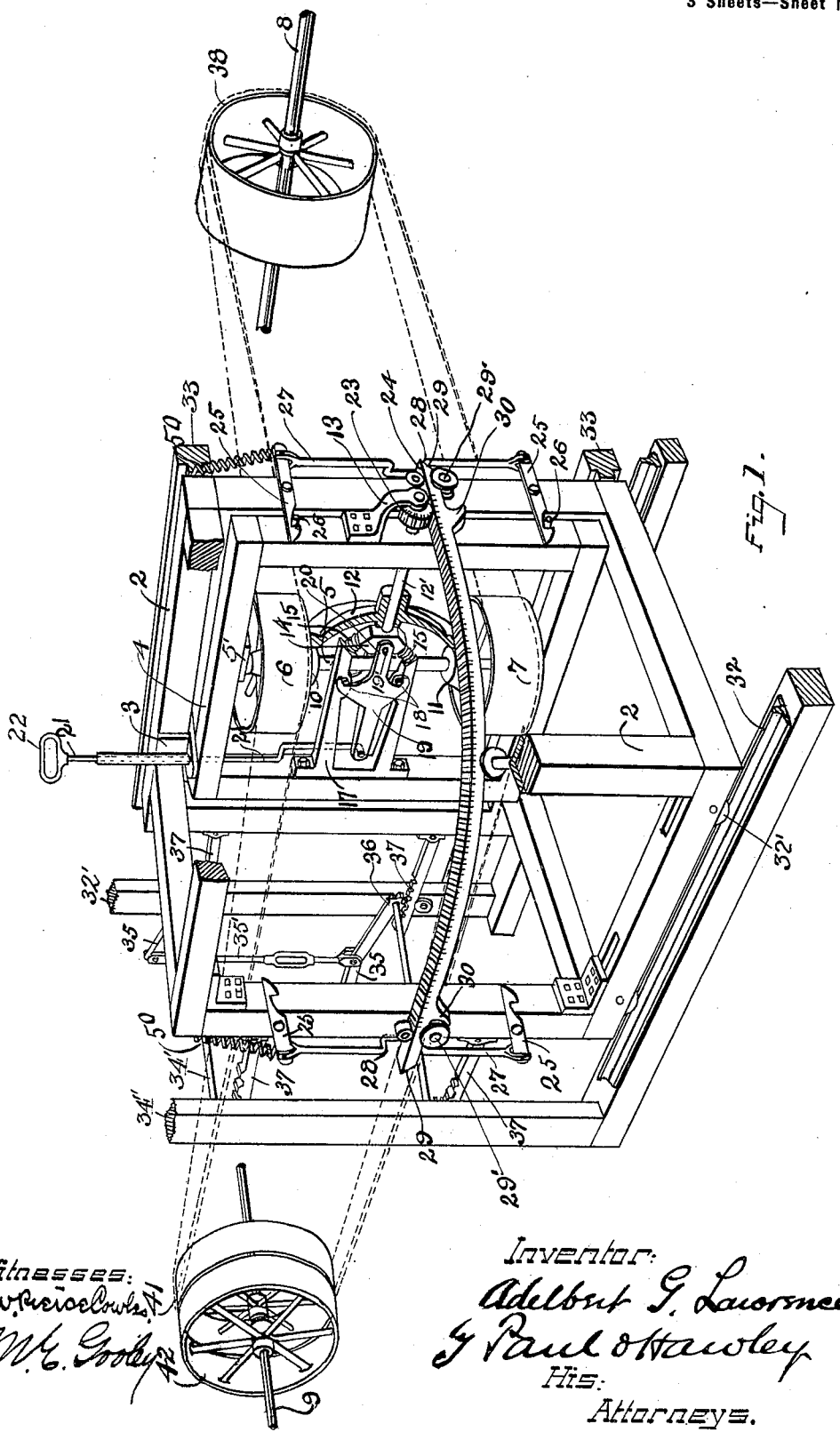

No. 619,491. Patented Feb. 14, 1899.
A. G. LAWRENCE.
SHIFTING MULE PULLEY.
(Application filed Sept. 21, 1897.)
(No Model.) 3 Sheets—Sheet 1.

Witnesses:
Inventor:
Adelbert G. Lawrence
by Paul O. Hawley
His Attorneys.

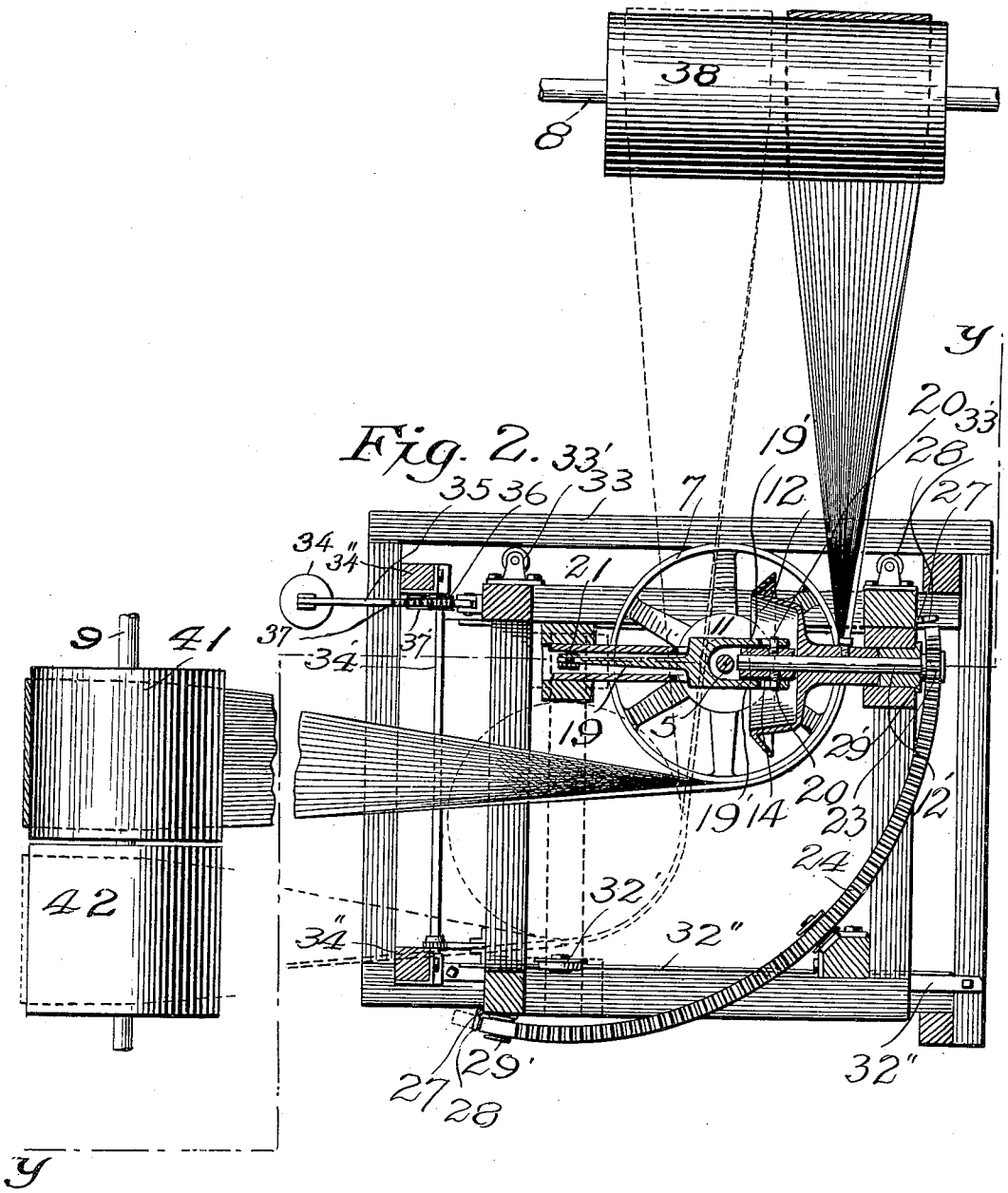

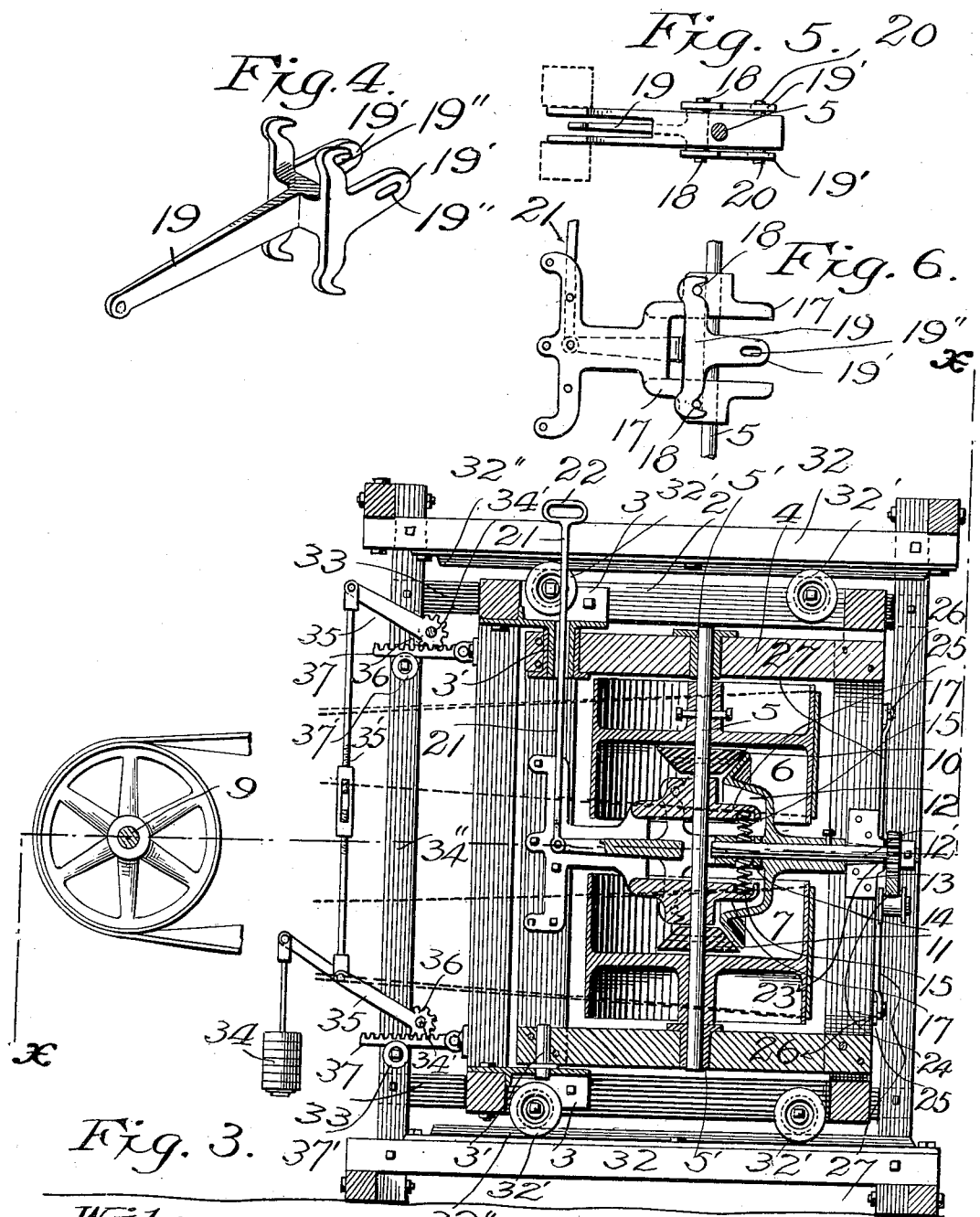

UNITED STATES PATENT OFFICE.

ADELBERT G. LAWRENCE, OF MOTLEY, MINNESOTA.

SHIFTING MULE-PULLEY.

SPECIFICATION forming part of Letters Patent No. 619,491, dated February 14, 1899.

Application filed September 21, 1897. Serial No. 652,432. (No model.)

*To all whom it may concern:*

Be it known that I, ADELBERT G. LAWRENCE, of Motley, Morrison county, Minnesota, have invented certain new and useful Improvements in Shifting Mule-Pulleys, of which the following is a specification.

My invention relates to mule-pulleys by which power is transmitted from one shaft to another at an angle thereto; and the invention relates particularly to shifting mule-pulleys whereby a mule-belt may be shifted from fixed to loose pulleys and vice versa.

The object of the invention is to provide shifting mule-pulleys, which will be located between the driving and driven shafts, which may be swung from one position into another to carry the belt from one pulley to the other upon a driven shaft and be operated by the movement of the mule-pulley shaft.

The invention consists generally in a suitable swinging frame, mule-pulleys carried thereon, and means operated from the pulley-shaft for swinging the frame.

The invention further consists in means for maintaining a tension upon the belt, and in particular means for swinging or shifting the mule-pulleys and for locking the same in either position.

The invention further consists in the constructions and combinations hereinafter described, and particularly pointed out in the claims.

The invention will be more readily understood by reference to the accompanying drawings, in which—

Figure 1 is a perspective view illustrating the construction and operation of the device, the upper guides and the upper portion of the frame being broken away to more clearly show the working parts. Fig. 2 is a horizontal sectional view on the line $x\,x$ of Fig. 3. Fig. 3 is a vertical sectional view on the line $y\,y$ of Fig. 2. Figs. 4, 5, and 6 are details of the mechanism for shifting the position of the swinging frame.

As shown in the drawings, 2 represents a frame, preferably rectangular in form, provided in one corner at the top and bottom with brackets 3, having studs or pins 3', which support a swinging frame 4, arranged in an upright position within the frame 2 and carrying the upright shaft 5, having its ends supported in bearings 5', and upon which shaft the mule-pulleys 6 and 7 are arranged. One of these pulleys is fixed upon the shaft 5, while the other is adapted to run loosely thereon.

8 represents a driving-shaft at the right of the frame, and 9 the driven shaft at the left thereof, the two shafts being at right angles to each other and the mule-pulley shaft 5 being at right angles to both the shafts 8 and 9. Upon the shaft 5, between the pulleys 6 and 7, are two beveled friction-wheels 10 and 11, both rigidly secured on the shaft and in position to be engaged by a larger friction-wheel 12 on the horizontal shaft 12', which is mounted in the bearing 13 on the outer end of the swinging frame 4 and at its inner end is supported by a cushion-block 14, which is in turn supported by coil-springs 15, carried by a yoke 17, secured in the inner side of the frame 4 and extending horizontally to a point beyond the shaft 5. This yoke is provided on its surface with pins 18 18, upon which a lever 19 is hung, said lever being provided with arms 19', projecting upon either side of the cushion-block 14 and having holes 19'' to receive the ends of a pin 20 in said block. The distance between the ends of the pin 20, the block 14, and the pins 18 18 upon the yoke is equal, so that as the lever 19 is thrown one lug upon each side of the lever will leave its pin 18 and the lever will swing from the opposite pin, thereby moving the inner end of the shaft 12' and bringing the surface of the friction-wheel 12 into engagement with the surface of one of the friction-wheels 10 or 11.

The lever 19 is operated by means of a rod 21, pivotally connected at its lower end to the inner end of said lever and provided at its upper end with a suitable handle or grip 22 and preferably extending up through the hollow stud or pin 3', which forms the pivot at the top of the swinging frame 4. The large friction-wheel 12 is drawn slightly forward by the movement of the lever 19, and when brought into engagement with the friction-wheels 10 or 11 the shaft 12' will be revolved either forward or backward, according to the direction in which the lever 19 is operated. The springs 15, arranged between the cushion-block and the yoke 17, break the force of a blow when the friction-wheel 12 comes in contact with the wheels 10 or 11, thereby preventing damage to the mechanism of the device.

The shaft 12' is provided at its outer end with a gear-pinion 23, which meshes with and travels over the surface of the rack 24, secured to the frame 2, when the frame 4 is swung from one position to another by the engagement of the friction-wheel 12 with one of the friction-wheels 10 and 11, said rack being in the form of a quadrant coincident with the studs or pins 3', on which the frame 4 swings. To prevent the frame 4 from moving after it has been shifted, I provide hooks 25, pivotally secured to the sides of the frame 2 at each end of the travel of said swinging frame in position to engage pins 26, provided on the outer side of said frame, as shown in Fig. 1. The pairs of hooks 25 are connected by vertical rods 27, having shoulders 28, in position to be struck by the beveled ends 29 of the rack 24. The rack 24 is supported by rollers 29' and is arranged to shift its position thereon, but is limited in its movement by lugs 30, provided on the side of the rack near its ends and adapted to engage the rollers 29', which support the ends of the rack. The hooks 25 are normally held in engagement with the pins 26 by springs 50, having their ends fastened to said hooks and to the frame 2.

The frame 2 is provided with trucks or rollers 32', bearing upon rails 32'', arranged upon horizontal timbers 32 at the top and bottom of the frame, and between which said frame is adapted to move toward or from the driven shaft 9. Similar guide-timbers 33 are provided at the top and bottom of the frame 2 on the side next to the driving-shaft 8 and parallel thereto. Trucks 33' are provided on the sides of the frame 2 to bear upon rails provided on the guide-timbers 33, said guides serving to carry the side strain of the belt. In order that a proper tension may be maintained upon the belt, I provide weights 34, acting through levers 35, mounted upon cross-rods 34', connecting the upright timbers 34'' at the left of the frame 2. At the pivoted ends of the levers 35 I provide gear-segments 36 to engage the racks 37, which are pivotally secured at their inner ends to the frame 2 and at their outer ends are supported upon the rollers 37', secured to the inner sides of the upright frame-posts 34''. The levers 35 are connected by the rods 35', so that all the levers will act simultaneously, and I prefer to provide these levers and racks at both the top and bottom of the frame in order to prevent the binding of the frame between the upper and lower guide-rails and to maintain an even tension upon the upper and lower runs of the belt. A wide pulley 38 is fixed on the driving-shaft 8. The pulley 42 is fixed upon the driven shaft 9, while the pulley 41 is loose thereon.

The operation of the device is as follows: With the belt upon the driving-pulley 38 and the mule-pulleys in the position shown in the drawings the belt will pass over the mule-pulleys and over the fixed pulley 42 on the driven shaft 9, while the frame 4, carrying the mule-pulleys, is locked by the hooks 25, which are in engagement with the pins 26 upon said frame, owing to the disengagement of the rod 27 from the end of the rack 24. When it is desired to shift the belt from the fixed to the loose pulley on the driven shaft and thereby stop said shaft, the rod 21 is operated to throw the large friction-wheel 12 into engagement with one of the friction-wheels 10 or 11, thereby rotating the shaft 12' and causing the pinion 23 to move forward over the rack 24. During the first part of this movement the swinging frame 4 will be held by the hooks 25. Consequently the rack 24 will be forced back until its beveled end strikes the shoulder 28 on the rod 27, depressing said rod, lifting the hooks 25, and thereby freeing the frame 4. The rack is stopped in its backward movement by the lug 30 engaging the roller 29', and when the lug strikes said roller the pinion 23 will begin to move over the rack and the frame 4 will swing in its bearings until the pinion 23 has reached the opposite end of the rack 24 and the frame 4 is in a position substantially at right angles to the driving-shaft, as shown by dotted lines in Fig. 2. As the pinion 23 approaches the end of the rack the pins 26 in the outer edge of the swinging frame will be engaged by the hooks 25 and locked in engagement therewith by the springs 50, which will hold said hooks in position until such time as the rod 21 is operated in the opposite direction and the pinion 23 begins its return movement and moves the rack backward to disengage the hooks 25, as heretofore described.

The swing of the pulleys is sufficient to carry the belt across the face of the driving-pulley 38 and over the idle-pulley 41 to the fixed pulley 42 on the driving-shaft, as shown by dotted lines in Fig. 2, which illustrates the travel of the shifting pulleys. By means of the movement of the frame 2 upon the trucks and the supporting guide-rails and the weights and levers provided at the left of the frame 2 a proper tension is at all times maintained upon the belts, which may be regulated at will by increasing or decreasing the weight 34.

This device is adapted for use in mills and factories where it is desired to deliver power by means of the belt from a driving-shaft which is at an angle to the shaft to which it is desired to deliver the power. Obviously any one skilled in the art might vary the details of construction herein shown and described, and I therefore do not confine myself to the specific construction shown.

Having thus described my invention, I claim as new and desire to secure by Letters Patent—

1. The combination, with the driving and the driven shafts, of the mule-pulley shaft, the mule-pulleys, and means operating in connection with said mule-pulleys for shifting or swinging said mule-pulley shaft and said pulleys, substantially as described.

2. The combination, with the driving and the driven shafts, of the mule-pulleys, a swinging frame whereby said mule-pulleys are carried, and means operating in connection with said mule-pulleys for swinging said frame, substantially as described.

3. The combination, with the driving and the driven shafts, of the mule-pulley shaft, the mule-pulleys thereon, the swinging frame whereby said mule-pulleys and shaft are carried, means operating in connection with said mule-pulley shaft and said pulleys for swinging said frame, and the support for said frame also being movable, substantially as described.

4. The combination, with the driving and the driven shafts, of the mule-pulleys, the frame whereon said mule-pulleys are carried, said frame being pivoted, means for locking said frame, and means in connection with said mule-pulleys for unlocking said frame and swinging the same, substantially as described.

5. The combination, with the driving and the driven shafts, of a swinging frame, arranged between them, the mule-pulley shaft provided in said frame, the mule-pulleys, the friction-wheels, the quadrant-rack and the pinion in connection with said friction-wheels, substantially as described.

6. The combination, with the driving and the driven shafts, of the swinging frame, the mule-pulleys carried thereon, the quadrant-rack having a limited movement, the pinion to engage the same, means for driving said pinion in one direction or the other from said mule-pulleys, or one of the same, and locks for said frame operated by the movement of said rack, substantially as described.

7. The combination, with the driving and the driven shafts, of the tracks, the frame movable thereon, the tension device provided in connection with the frame, the swinging frame provided in the first-mentioned frame, the mule-pulleys carried thereon, and means operating in connection with said mule-pulleys for moving said swinging frame, and means for securing the same at the limit of its travel in either direction, substantially as described.

8. The combination, with the driving and the driven shafts, of the frame movable in a direction parallel with said driving-shaft, the mule-pulleys, the shaft whereon said pulleys are supported, the swinging frame supported by said first-named frame and wherein said mule-pulley shaft is secured, and means operating in connection with said shaft and said pulleys to swing said frame, substantially as described.

9. The combination, with the driving and the driven shafts, of a frame movable in a direction substantially parallel with said driving-shaft, the guide-rails, the tension device provided in connection with said frame, the swinging frame, the shaft carried by said swinging frame, the mule-pulleys arranged on said shaft, and means operating in connection with said mule-pulleys for swinging said frame, substantially as described.

10. In a device of the class described, the combination, with the swinging frame, of a shaft carried thereby, mule-pulleys thereon, friction-wheels carried by said shaft, the shaft 12' also carried by said frame, the friction-wheel 12 at the inner end of said shaft, the cushion-block 14, the levers connected thereto, and means extending without said frame for operating said levers, substantially as described.

11. In a device of the class described, the combination, with the swinging frame, of a shaft carried thereby, the mule-pulleys thereon, the shaft 12', friction-wheels 10 and 11, the friction-wheel 12 carried by said shaft, means for throwing said wheel 12 into engagement with one of said wheels 10 and 11, the pinion 23, and the rack 24 whereon said pinion travels, substantially as described.

In testimony whereof I have hereunto set my hand this 26th day of May, A. D. 1897.

ADELBERT G. LAWRENCE.

In presence of—
JOHN CRITCHLOW,
F. D. NEWKIRK.